United States Patent [19]

Mahvi et al.

[11] Patent Number: 5,234,143
[45] Date of Patent: Aug. 10, 1993

[54] MULTIPURPOSE TRAVEL BAG

[76] Inventors: A. Pascal Mahvi; Caryl L. Mahvi, both of P.O. Box 5160, Huntington Beach, Calif. 92615

[21] Appl. No.: 834,689

[22] Filed: Feb. 11, 1992

Related U.S. Application Data

[63] Continuation-in-part of Ser. No. 525,542, May 17, 1990, abandoned, which is a continuation-in-part of Ser. No. 421,530, Oct. 13, 1989, Pat. No. 5,062,557.

[51] Int. Cl.$^5$ ............................................. B62J 9/00
[52] U.S. Cl. ...................................... 224/31; 224/151; 224/155; 224/32 A; 224/39; 280/288.4
[58] Field of Search ............ 224/153, 155, 151, 156, 224/30 R, 31, 32 R, 32 A, 39, 42; 206/372, 373, 547; 190/8, 1, 108, 110, 111, 125; 383/110; 294/141; 297/243, DIG. 9; 280/288.4, 202; 296/97.21

[56] References Cited

U.S. PATENT DOCUMENTS

| | | | |
|---|---|---|---|
| 2,399,787 | 5/1946 | Clerc | 62/91.5 |
| 2,598,385 | 5/1952 | Hume | 155/41 |
| 3,122,225 | 2/1964 | Ward | 190/52 |
| 3,625,405 | 12/1971 | Kezar et al. | 224/32 A |
| 3,696,850 | 10/1972 | Rosenblum | 150/33 |
| 3,830,348 | 8/1974 | Ohyama | 190/43 |
| 3,902,640 | 9/1975 | Geiben | 224/8 R |
| 4,085,968 | 4/1978 | Sversson et al. | 224/30 R X |
| 4,236,657 | 12/1980 | Brunton | 224/153 |
| 4,350,361 | 9/1982 | Fujii | 280/289 A |
| 4,367,829 | 1/1983 | Kusz | 224/31 |
| 4,383,625 | 5/1983 | Kiang | 224/39 |
| 4,410,116 | 10/1983 | Mattei | 224/40 |
| 4,666,071 | 5/1987 | Irwin et al. | 224/39 |
| 4,673,117 | 6/1987 | Calton | 224/151 |
| 4,676,548 | 6/1987 | Bradbury | 297/129 |
| 4,693,345 | 9/1987 | Mittelmann | 190/108 |
| 4,746,044 | 5/1988 | Arivizu et al. | 224/155 X |
| 4,781,277 | 11/1988 | Lim | 190/1 |
| 4,792,024 | 12/1988 | Morton et al. | 190/1 |
| 4,792,072 | 12/1988 | Gibson | 224/32 A |
| 4,819,793 | 4/1989 | Willard et al. | 206/162 |
| 4,883,207 | 11/1989 | McArthur | 224/153 |
| 4,886,150 | 12/1989 | Fitzsimmons | 190/1 |
| 4,923,104 | 5/1990 | Rice et al. | 224/155 |
| 5,062,557 | 11/1991 | Mahvi et al. | 224/153 |
| 5,071,146 | 12/1991 | Lewis et al. | 224/30 R X |
| 5,087,095 | 2/1992 | McFate | 224/155 X |

*Primary Examiner*—Henry J. Recla
*Assistant Examiner*—Glenn T. Barrett
*Attorney, Agent, or Firm*—Stetina and Brunda

[57] ABSTRACT

A multipurpose traveling bag for carrying personal items and/or infant care supplies comprising a primary bag section and a removable auxiliary bag section is disclosed. The primary bag section can be hand carried or worn as a backpack with or without the removable auxiliary bag section. The primary bag section has a fold down seat that can be used as a booster seat by infants in a first or infant care bag embodiment of the present invention and can be used as a seat for adults in a second or backpack embodiment of the present invention. In a third embodiment, the present invention is adapted to be mounted upon a bicycle to additionally provide an infant bicycle seat. In all three embodiments a cooler compartment provides for the storage of perishable food items. The multipurpose traveling bag is constructed of a vinyl or nylon covered extruded plastic framework or can be fabricated from vacuum formed plastic. It is therefore lightweight and easy to clean.

11 Claims, 8 Drawing Sheets

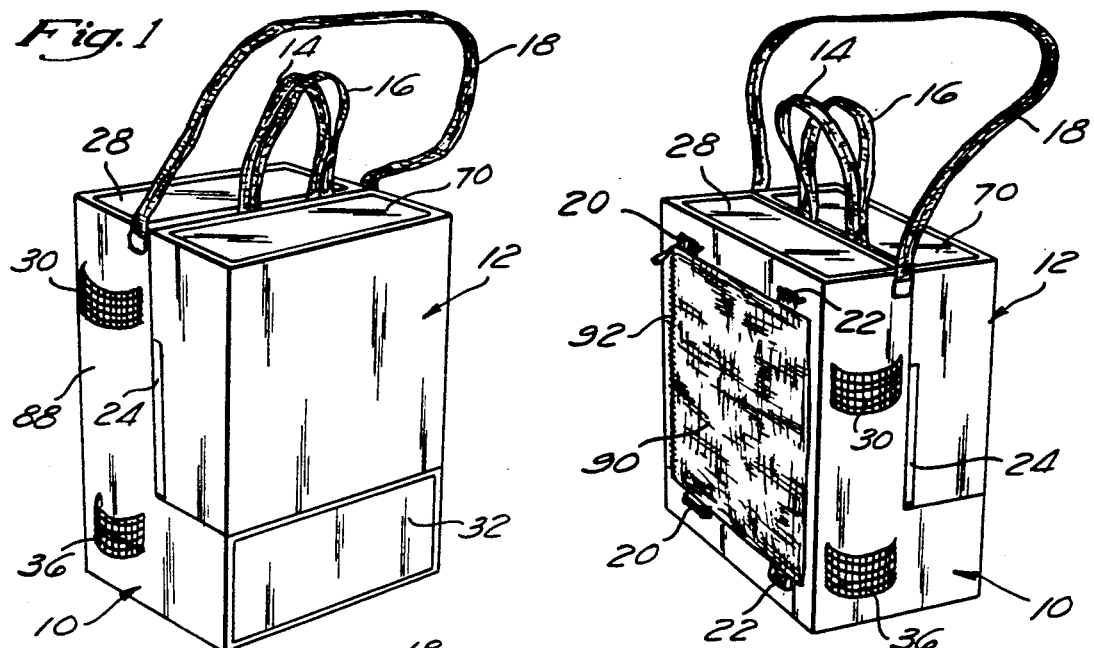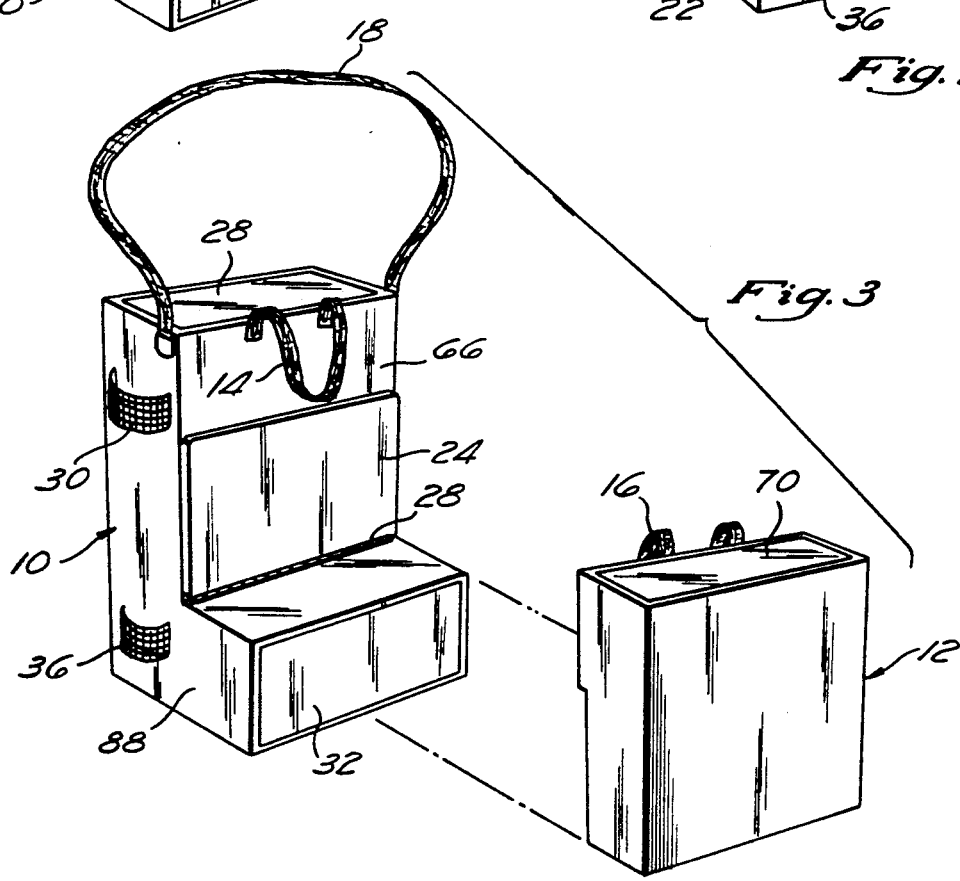

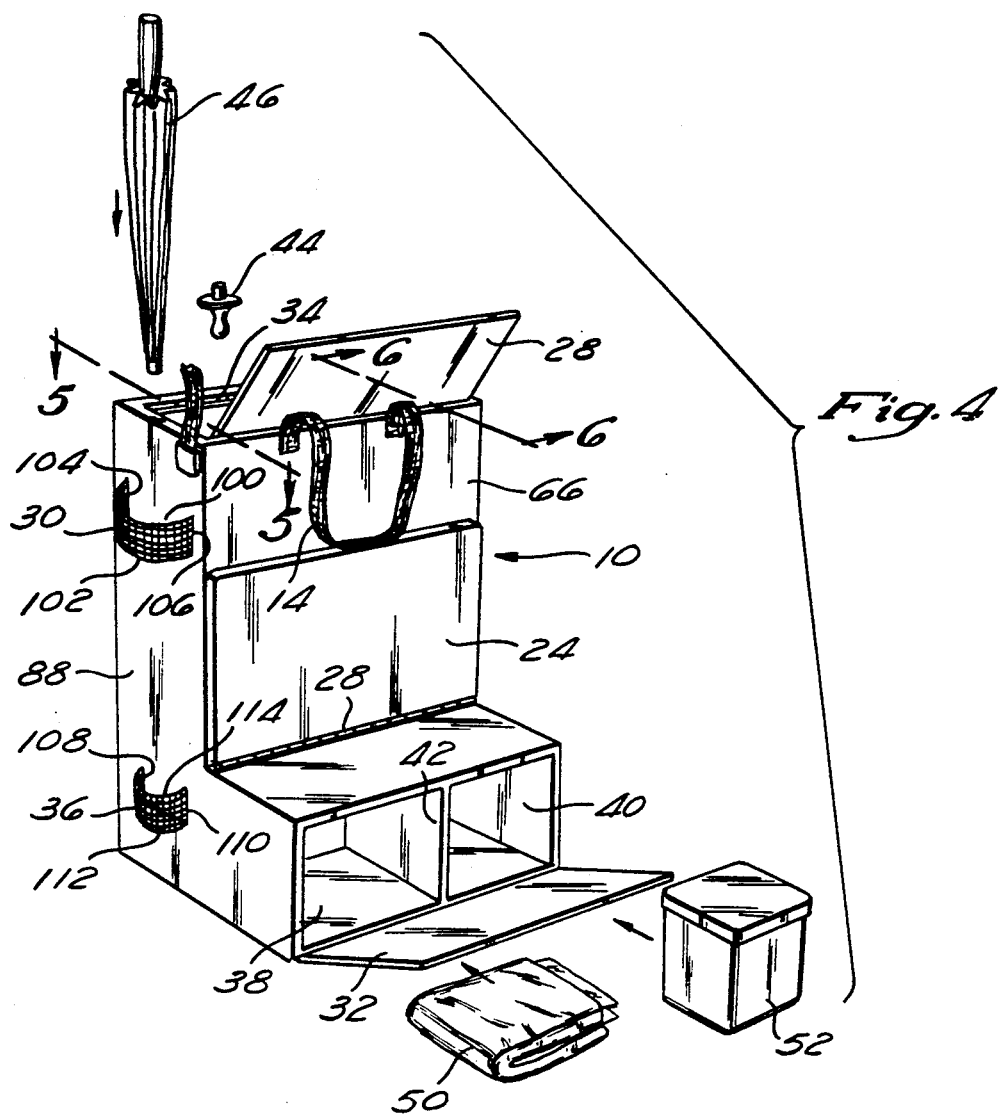
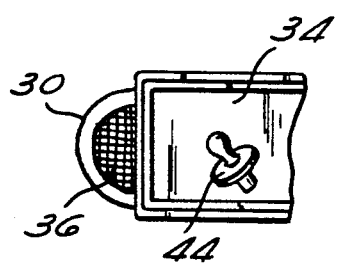
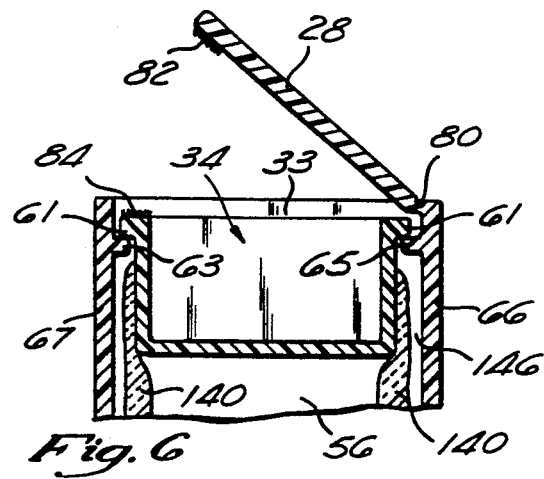

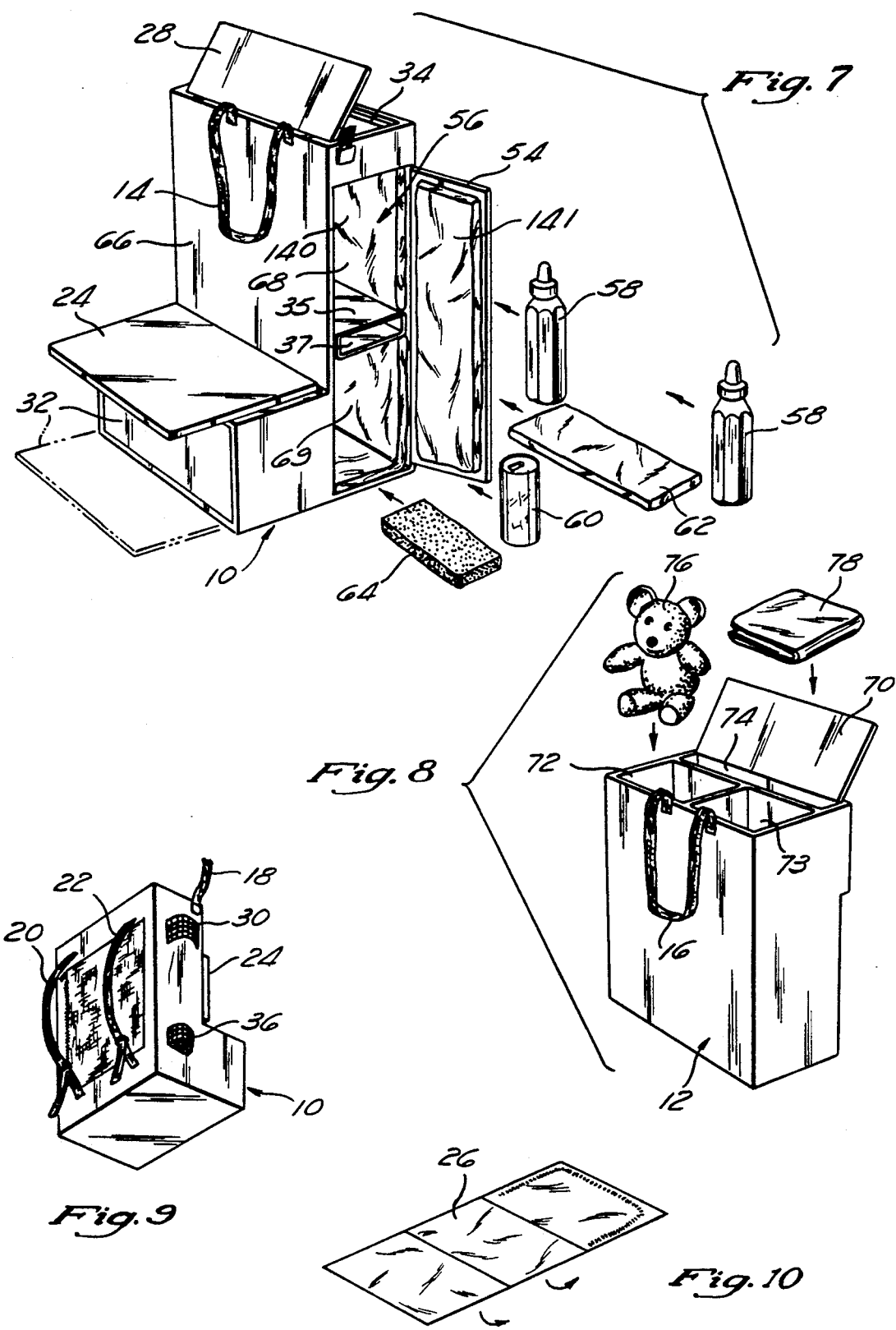

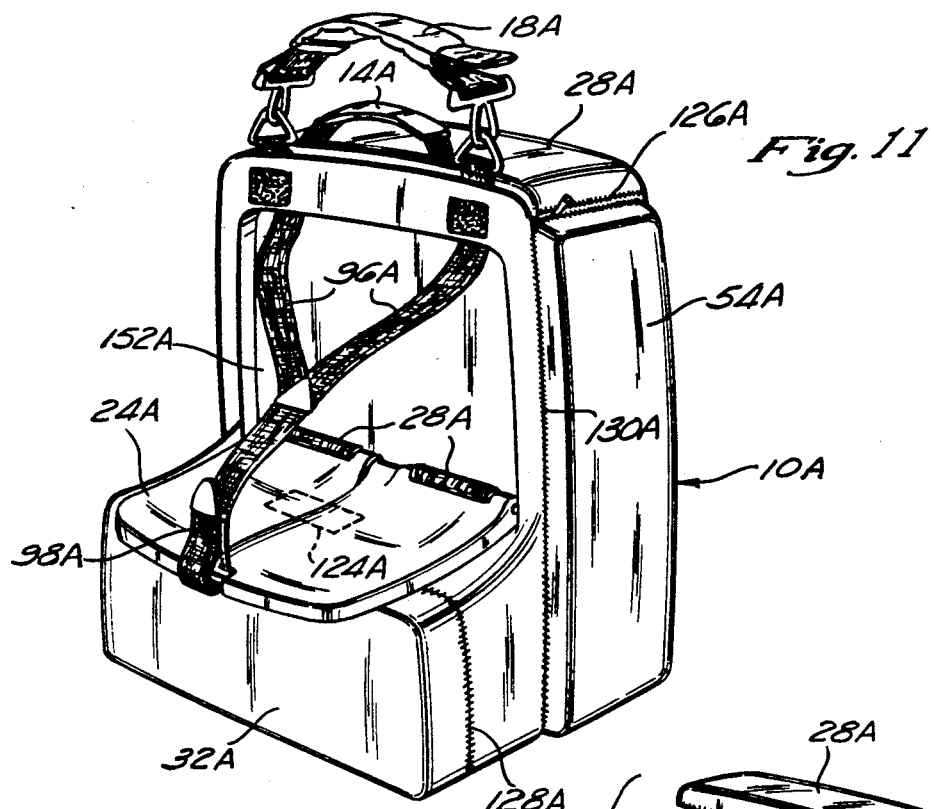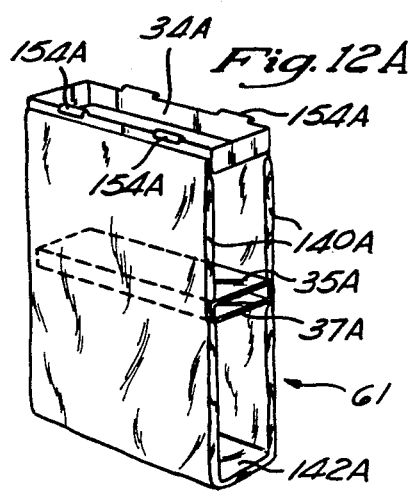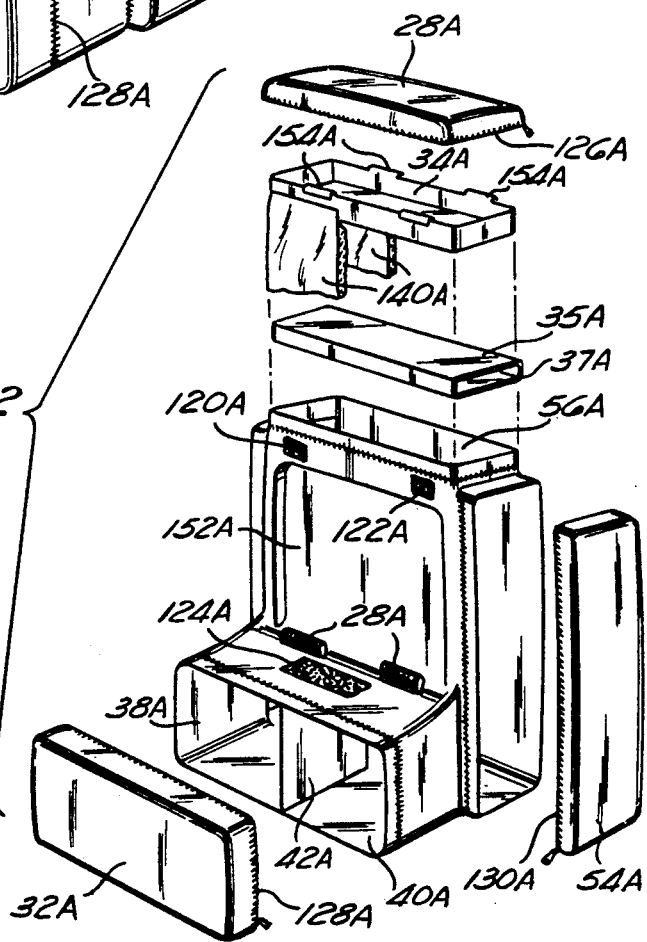

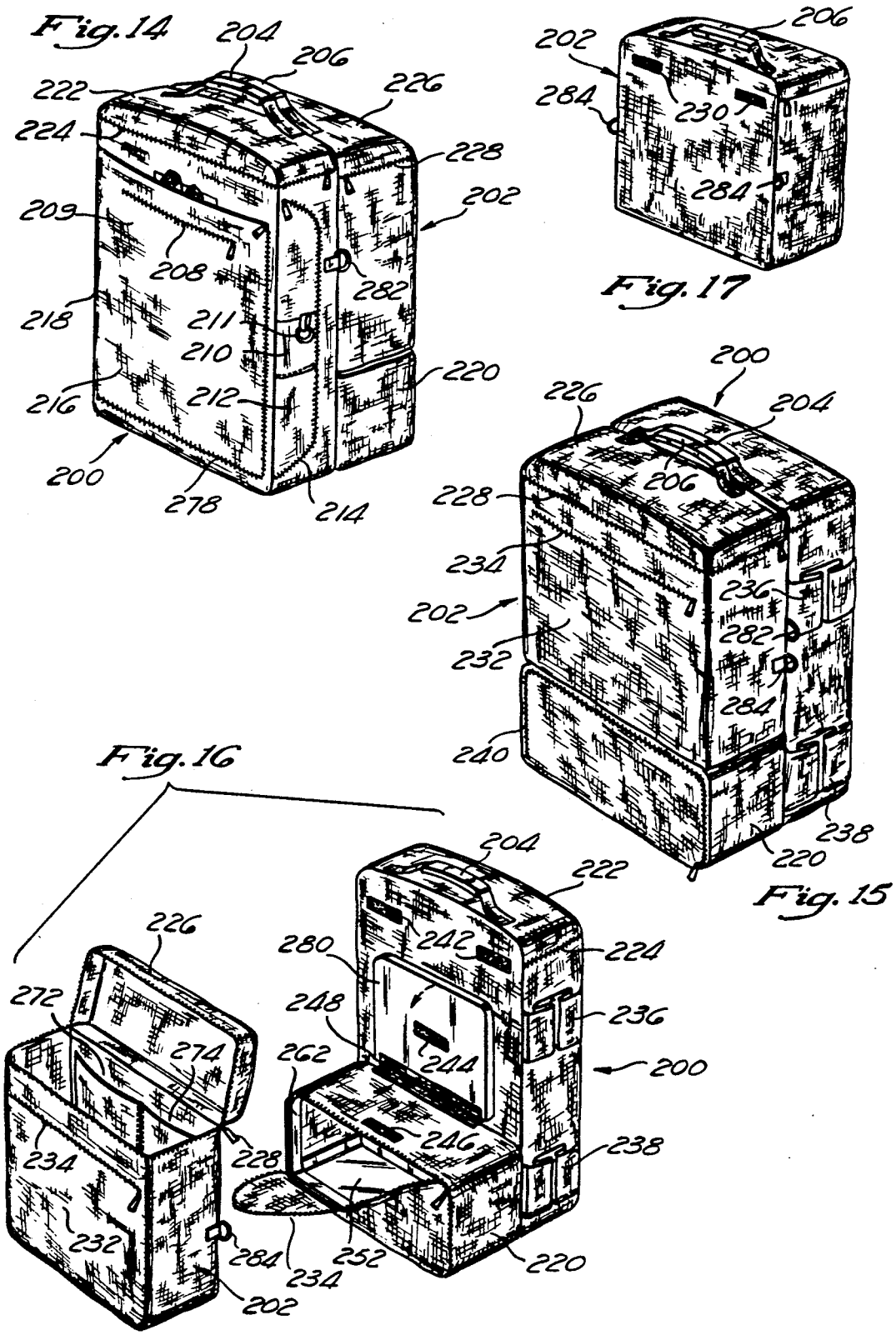

Fig. 21
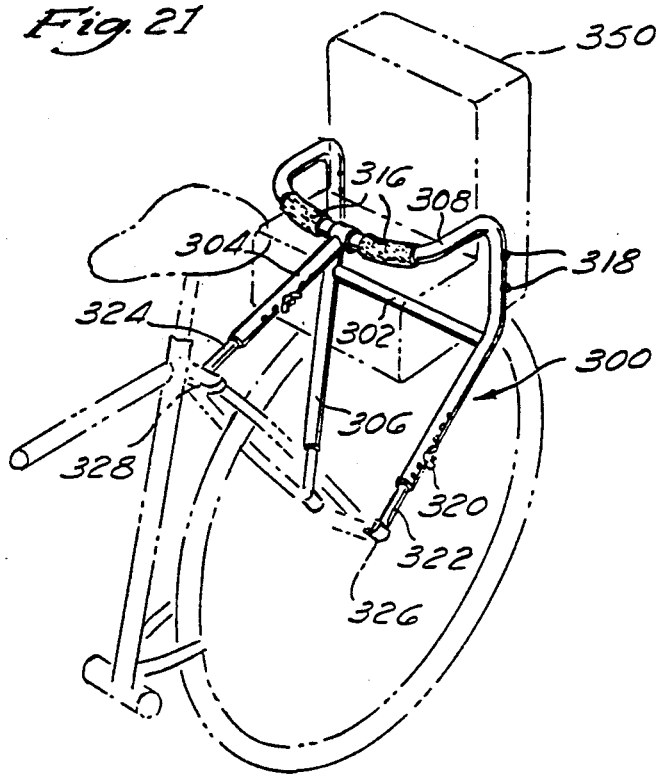
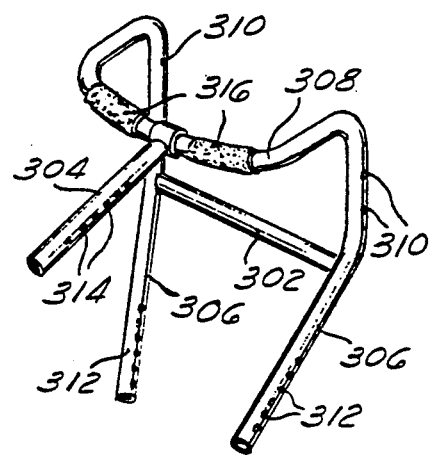
Fig. 22
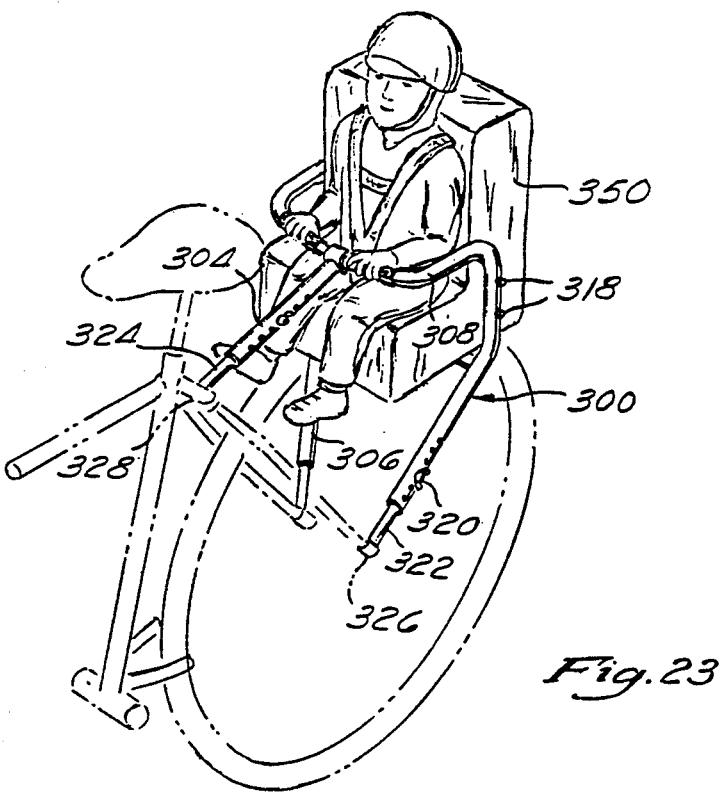
Fig. 23

MULTIPURPOSE TRAVEL BAG

The subject application is a continuation-in-part of co-pending U.S. patent application Ser. No. 525,542 filed on May 17, 1990, now abandoned, and entitled Multipurpose Travel Bag, which is a continuation-in-part of U.S. patent application Ser. No. 421,530 filed on Oct. 13, 1989 entitled Infant Care Bag which matured into U.S. Pat. No. 5,062,557 on Nov. 5, 1991. The contents of U.S. patent application Ser. No. 525,542 and U.S. Pat. No. 5,062,557 are hereby incorporated by reference.

FIELD OF THE INVENTION

The present invention relates generally to traveling bags, and more particularly to a multipurpose traveling bag for carrying personal items and/or infant care supplies. The bag comprises a primary bag section and a removable auxiliary bag section. The primary bag section can be hand carried or worn as a backpack with or without the removable auxiliary bag section. The primary bag section has a fold down seat that can be used as a booster seat by infants in a first or infant care bag embodiment of the present invention and can be used as a seat for adults in a second or backpack embodiment of the present invention. In a third embodiment, the present invention is adapted to be mounted upon a bicycle to additionally provide an infant bicycle seat. In all three embodiments a cooler compartment provides for the storage of perishable food items.

BACKGROUND OF THE INVENTION

Bags for carrying and storing personal items and/or infant care supplies are well known. Suitcases, backpacks, and diaper bags are perhaps the most common of such devices. Suitcases are well known for carrying clothing and other personal items when traveling. Backpacks are likewise well known for carrying clothing, personal items, and camping supplies when hiking or camping.

Suitcases are commonly comprised of an upper and lower half which close in a clam shell fashion to contain items therein. A latch or zipper secures the suitcase in a closed configuration and prevents the inadvertent emptying of its contents. Generally, a single handle is attached to the suitcase such that it may be hand carried.

Backpacks are commonly comprised of a canvass or nylon bag having shoulder straps which permit the bag to be conveniently carried upon the user's back. A flap typically covers an opening in the uppermost end of the backpack and is secured in a closed position With a zipper, hook and loop fasteners, or the like. In addition to being used for camping and hiking, backpacks are also commonly used to carry books and school supplies to and from school, on short outings such as picnics and when traveling.

Food is often carried in backpacks to be consumed on picnics or when camping or traveling. The type of food which may be carried in a knapsack is limited to foods which are not rapidly perishable. Foods whose temperature must be maintained at a lower temperature than the environment cannot be carried in a backpack since they will spoil. Thus, if such foods are desired, a separate cooler must also be carried.

A diaper bag is typically a fabric bag for storing both clean and soiled diapers, bottles, tissues, hand towels, and the like. Some diaper bags have a separate compartment for bottles. Some diaper bags also provide for the storage of a changing pad.

Such devices as diaper bags simplify the transportation and storage of infant care supplies, however they do not provide for the cooling of beverage and food items or the organization of a very large variety of infant care supplies.

Portable seats for use at sports events, the beach, while camping and the like are well known. Such seats are typically lightweight foldable devices whose bottom and back may be disposed in laminar juxtaposition and whose legs may be tucked in next to the bottom for storage and convenient carrying. However, when a seat is desired on occasions when another bag must be carried, then the seat adds to the carried weight and may become so inconvenient that it is preferably left behind.

Coolers are commonly used to store food and beverage items which must be kept at a low temperature to prevent spoilage. Such coolers do not readily accommodate the storage of a large variety of non-food items.

Booster chairs are commonly required when both dining out and eating at home to elevate an infant to a height where the infant can eat food placed upon a table.

Changing pads are often carried by persons with infants to provide a clean, soft surface upon which the infant's diaper may be changed. The changing pad keeps the infant and new diaper clean if changing occurs upon the ground, for example. The changing pad keeps the infant and soiled diaper from soiling other items, such as a bed or sofa, upon which changing may also occur.

Infant bicycle seats are well known. They commonly attach above the rear wheel of a bicycle and provide a means by which an infant may be carried along with the adult on the bicycle. Such infant bicycle seats typically comprise a mounting apparatus for attaching the seat to the bicycle, a plastic molded seat upon which the infant may be disposed, and straps for securing the infant upon the seat.

In the prior art the suitcase, backpack, diaper bag, cooler, seat or booster chair, and changing pad are all separate items which must be carried and stored as separate items. It is difficult, if not impossible for a single individual to carry all of these items simultaneously. Storage of each of these items in a common area, the trunk of a car for example, is difficult because of the amount of space required. Also, no provision is made with prior art infant bicycle seats to carry infant supplies and/or food. It would therefore be desirable to provide a single apparatus which would provide for the transportation and storage of personal items and/or infant care supplies, perishable food and beverage items, and which could also be used as an adult's seat or child's booster seat. As such, although the prior art has recognized the need for the individual items, no means has been provided whereby each of these items may be integrated into a single unit for convenient transportation and storage.

SUMMARY OF THE INVENTION

The present invention specifically addresses and alleviates the above-mentioned deficiencies associated in the prior art. More particularly, the present invention comprises a multipurpose traveling bag for carrying personal items and/or infant care supplies comprising a primary bag section and a removable auxiliary bag section. The primary bag section can be hand carried or worn as a backpack with or without the removable auxiliary bag section. The primary bag section has a fold down seat that can be used as a booster seat by infants in a first or infant care bag embodiment of the present invention and can be used as a seat for adults in a second or backpack embodiment of the present invention. In a third embodiment, the present invention is adapted to be mounted upon a bicycle to additionally provide an infant bicycle seat. In all three embodiments a cooler compartment provides for the storage of perishable food items. The multipurpose traveling bag is constructed of a vinyl or nylon covered extruded plastic framework, or can be fabricated from vacuum formed plastic. It is therefore lightweight and easy to clean.

The first embodiment of the present invention is an infant care bag for storing baby bottles, beverages, perishable food items, diapers, wet wipes, a changing pad, and other infant care supplies. The infant care bag can be separated into a primary bag section and a removable auxiliary bag section. The primary bag section can be worn as a backpack with or without the auxiliary removable section. The primary bag section is specifically formed to store a variety of commonly used infant care supplies and perishable beverage and food items and can be used as a booster chair for infant feeding. The removable auxiliary section provides additional storage space and can be used independently of the primary bag section.

The primary bag section and the removable auxiliary section contain a plurality of compartments which are specifically sized to store particular infant care items. For instance, compartments within the cooler are sized to store baby bottles without permitting them to overturn. Also, the left and right rear compartments of the primary bag are specifically sized to store diapers and Baby Fresh (a registered trademark of Scott Paper Company) premoistened tissues respectively. The various infant care items fit snugly into their respective compartments, thus minimizing wasted space and providing the best possible protection to the contents of the infant care bag.

After the infant matures to a point where a large variety of infant care supplies are no longer required, then the infant care bag can be used to store and transport other items. The infant care bag is ideal for day outings such as trips to the beach, sporting events, and picnics. It can be used to carry such items as camera equipment, clothing, food, and soft drinks. Therefore, the infant care bag is not limited to use with infant care supplies.

The second embodiment of the present invention is a backpack for hiking, camping, picnics, and the like. It comprises a primary bag section and an auxiliary bag section as in the first embodiment. A seat attached to the primary bag section is suitably sized and configured such that an adult may comfortably sit thereupon. A cooler compartment is provided within the primary bag section for the storage and carrying of perishable food items. Thus, the backpack of the second embodiment of the present invention provides a convenient means for carrying personal items and perishable food items to a remote location where the backpack may then be used as a comfortable and convenient seat.

The third embodiment of the present invention is an infant bicycle seat having a plurality of closable compartments formed thereon. One of the closable compartments is a cooler section which may be used for the storage and transportation of perishable food items. The cooler is particularly useful for carrying infant formula and the like. Thus, a convenient means is provided to carry infant care supplies and perishable food items while simultaneously providing a secure means of carrying the infant upon a bicycle.

These, as well as other future advantages will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the first embodiment infant care bag of the present invention fabricated of fabric covered extruded plastic;

FIG. 2 is a perspective view of the infant care bag of FIG. 1 rotated approximately 90 degrees about its vertical axis;

FIG. 3 is a perspective view of the infant care bag of FIG. 1 showing the removable auxiliary bag section detached from the primary bag section;

FIG. 4 is a perspective view of the primary bag section of FIG. 3 showing the doors in an open disposition and also showing representative supplies which may be stored within the compartments thereof;

FIG. 5 is a sectional plan view of the primary bag section of FIG. 4 showing the inside of the upper compartment and also showing the webbing used for the storage of an umbrella or the like;

FIG. 6 is an enlarged cross-sectional view of the top compartment of FIG. 4 showing the construction of the door hinge and the hook and loop latch;

FIG. 7 is a perspective view of the primary bag section of the infant care bag of FIG. 4 showing the cooler compartment and representative supplies that may be stored therein, and also showing the booster seat disposed in an operative position;

FIG. 8 is a perspective view of the removable auxiliary bag section of the infant care bag of FIG. showing the three compartments formed therein;

FIG. 9 is a perspective view of the primary bag section of the infant care bag of FIG. 1 configured for use as a backpack and having the removable auxiliary bag section detached; and FIG. 10 is a perspective view of the changing pad disposed in an unfolded or operative position;

FIG. 11 is a perspective view of the primary bag section of an alternative construction of the first embodiment of the present invention, fabricated of vacuum formed plastic, showing the booster seat disposed in an operative position;

FIG. 12 is an exploded perspective view of the primary bag section of FIG. 11;

FIG. 12A is a perspective view of the removable insulating curtain and shelf of the cooler compartment of the infant care bag of FIG. 11;

FIG. 14 is a perspective view of the second embodiment or backpack of the present invention;

FIG. 15 is a perspective view of the backpack of FIG. 14 rotated 180 degrees about its vertical axis;

FIG. 16 is a perspective view of the backpack of FIG. 14 rotated 180 degrees about its vertical axis and showing the removable auxiliary bag section detached from the primary bag section;

FIG. 17 is a perspective view of the auxiliary bag section of the backpack of FIG. 14;

FIG. 21 is a perspective view of the attachment frame of the third embodiment or infant bicycle seat of the present invention illustrating how the attachment frame attaches the infant bicycle seat to a bicycle;

FIG. 22 is a perspective view of the attachment frame of FIG. 21 apart from the bicycle; and FIG. 23 is a perspective view of a bicycle having a bicycle seat of the present invention installed thereon and showing a child seated upon the bicycle seat.

DETAILED DESCRIPTION OF THE PREFERRED EMBODIMENT

Figure 13:
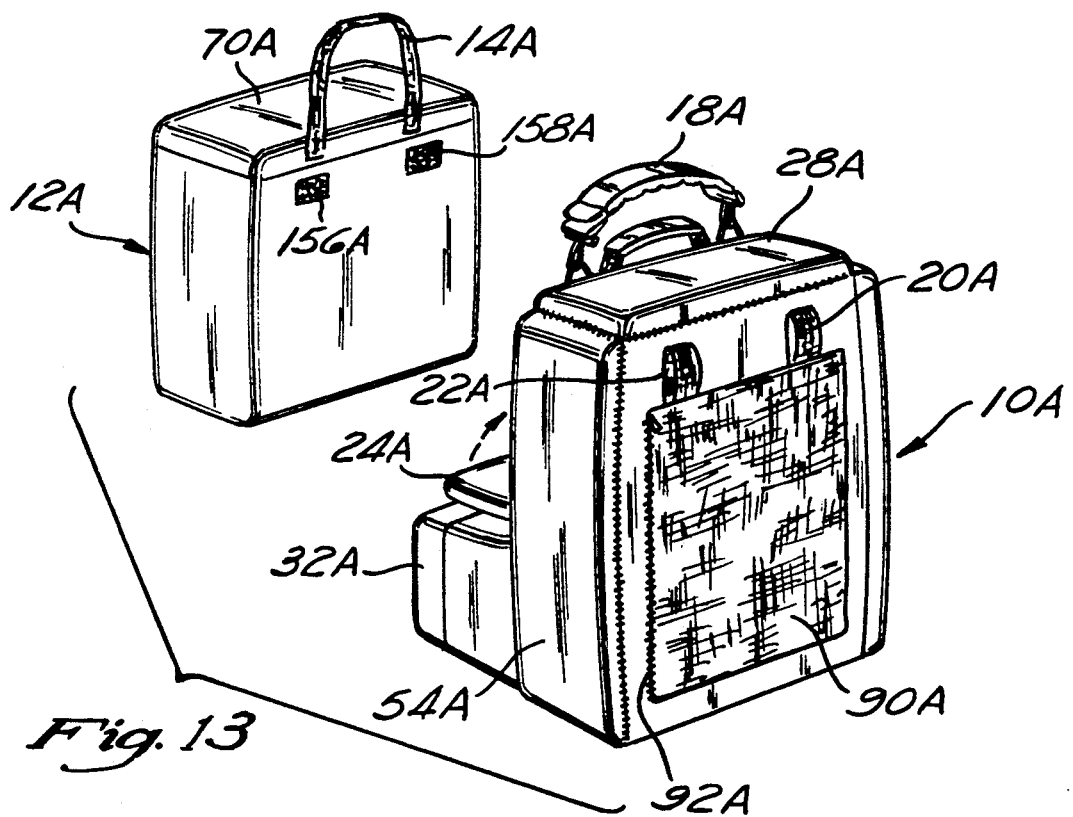
FIG. 13 is a perspective view of the infant care bag of FIG. 11 showing the removable auxiliary section detached from the primary section.
Figure 18:
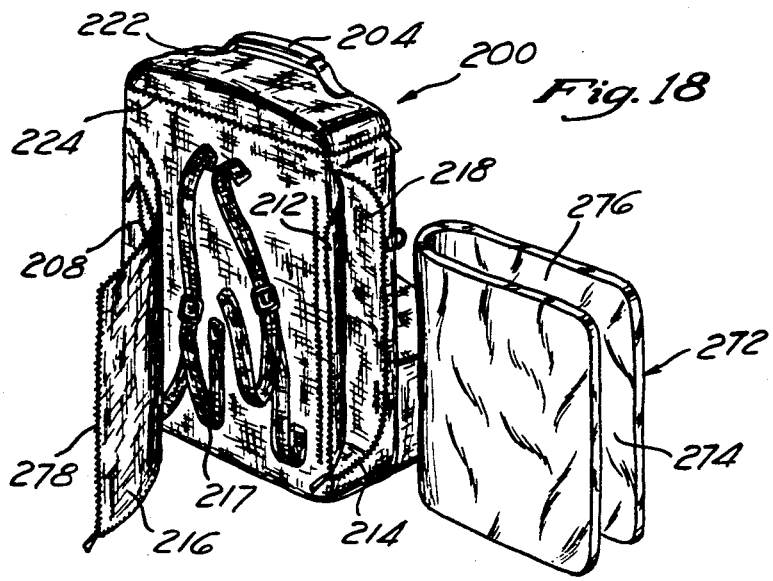
FIG. 18 is a perspective view of the backpack of FIG. 14 showing the shoulder straps and the insulating curtain disposable within the cooler compartment.

The multipurpose travel bag of the present invention is illustrated in FIGS. 1-22 which depict three presently preferred embodiments of the invention.

Referring now to FIGS. 1-10, the infant care bag of the first embodiment of the present invention is comprised of a primary bag section 10 and a removable auxiliary bag section 12, each having a plurality of closable compartments formed therein. First 14 and second 16 handles permit the infant care bag to be conveniently carried by hand. A shoulder strap 18 allows the infant care bag to be carried from the shoulder in a fashion similar to that of a common ladies' shoulder bag. First 20 and second 22 adjustable straps (FIG. 9) permit the infant care bag to be carried as a backpack, thus freeing the hands to hold and care for the infant. The straps 20 and 22 can be stowed within pouch 90 which can then be closed with zipper 92. Handles 14 and 16 can be detached by utilizing quick release buckles. Both the handles 14 and 16, the shoulder strap 18, and straps 20 and 22 are preferably formed of a durable padded fabric, such as nylon.

As shown in FIG. 3, the removable auxiliary bag section 12 may be detached from the primary bag section 10 to which it is secured with an attachment means such as hook and loop fasteners.

Detaching the removable auxiliary bag section 12 from the primary bag section 10 permits the user to carry either section alone depending upon the specific needs of the occasion. The primary bag section 10 has a larger storage capacity and also has the provision for cooling beverage and food items. In addition, it can also be used as a booster seat for the infant at meal time. The removable auxiliary bag section 12 is considerably smaller and lighter in weight, thereby making it more convenient when the quantity of supplies required is smaller. For instance, the primary bag section 10 alone may be most useful for infant feeding applications where a larger variety of infant care supplies are required and a booster seat is useful. The removable auxiliary bag section 12, on the other hand, might be most useful for a short trip to the market or when used as a handbag. A changing pad 26 stored within the removable auxiliary bag section 12 provides a convenient surface upon which the infant's diaper may be changed and the infant may be cleaned. An extended excursion is best accommodated by the combination of the primary bag section 10 and the removable auxiliary bat section 12, thus providing the maximum capacity of the infant care bag and also providing a useful combination for both feeding and changing the infant.

A seat 24 pivotally connected to the primary bag section 10 by a hinge 28, has a stowably disposed position as shown in FIG. 3 and an operably disposed position as shown in FIG. 7. Attachment means, such as hook and loop fasteners, secure the seat 24 against the back panel 66 in its stowably disposed position.

Referring now to FIG. 4, the primary bag section 10 is shown having its top 28 and rear 32 doors open. Opening the top door 28 reveals the top compartment 34. Opening the rear door 32 reveals the first 38 and second 40 rear compartments. The first 38 rear compartment is specifically sized to receive four to eight disposable diapers such as Huggies (registered trademark of Kimberly-Clark). The second 40 rear compartment is specifically sized to receive a single standard sized container of Baby Fresh pre-moistened tissues. The standard sized container has a height of approximately 6 inches, a width of approximately 5 inches and a depth of approximately 5 inches. A partition 42 separates the first 38 and second 40 rear compartments.

The top compartment 34 is relatively shallow, having a depth of approximately two inches, and is used to store small miscellaneous items, such as the bottle nipples and pacifiers 44. An upper webbing 30 and a lower webbing 36 are attached to left panel 88 of the primary bag section 10. The upper webbing 30 is attached to the left panel 10 along its left 104 and right 106 edges such that an elongate object, e.g. an umbrella, may be passed between the web 30 and the left panel 88 by inserting the elongate object under the web 30 at its upper horizontal edge 100 and forcing the elongate object downward until it appears from the lower 102 horizontal edge of the webbing 30. The lower webbing 36 is attached to the left panel 88 of the primary bag section 10 at its left 108 and right 110 edges and bottom 112. The top 114 edge of the webbing 36 is not secured to the left panel 88 of the primary bag section 10 such that the elongate object disposed intermediate the upper webbing 30 and the left panel 88 can be manually forced into the pocket formed by the lower webbing 36 and the left panel 88. The upper 30 and lower 36 webbing define a convenient storage means wherein an umbrella may be placed and yet remain readily accessible. The umbrella can be placed in the storage means while wet, and then permitted to dry while being stowed. The upper 30 and lower 36 webbing permit the free circulation of air about the umbrella to facilitate rapid drying and prevent the formation of mold or mildew.

Referring now to FIG. 7, the right door 54 is open to reveal the cooler compartment 56. The cooler compartment 56 is comprised of two smaller compartments 68 and 69 into which such items as baby bottles 58, soft drinks 60, and other perishable food items may be placed. An ice substitute 62 may be placed into cavity 37 of shelf 35 to chill the cooler compartment and maintain its temperature at a level suitable for the storage of perishable food items. A cold pack, such as Coldpak (a trademark of Cold Ice) product number 24PB manufactured by Cold Ice may be used. A sponge 64 may be placed in the bottom of the cooler section 56 to absorb moisture which results from condensation inside the cooler compartment 56.

The seat 24, which permits the primary bag section 10 to be used as a booster seat for feeding an infant is shown in FIG. 7 in the operably disposed position. The seat 24 is shown in FIG. 4 in the stowably disposed position. Hook and loop fasteners secure the seat 24 in the stowably disposed position. The seat 24 is used by simply detaching the removable auxiliary bag section 12, if installed, and rotating the seat 24 from the stowably disposed position to operably disposed position. The primary bag section 10 is then placed upon a chair and the infant is placed upon the seat 24.

Referring now to FIG. 8, the removable auxiliary bag section 12 of the infant care bag is depicted. The removable auxiliary bag section 12 can be used alone as a handbag. It is ideal for situations where it is expected that the infant will need to have its diaper changed but where feeding is not necessary. The removable auxiliary bag section has a top door 70 and three compartments 72, 73, and 74, each of which extend the full height of the removable auxiliary bag section 12. Various items, such as a child's stuffed bear 76 and a wash cloth 78, for example, can be stored in the first 72 and second 73 compartments of the removable auxiliary bag section 12. A changing pad 26 may be stored in compartment 74 which specifically is sized to receive a changing pad. Compartment 74 has a depth of 8 to 20 inches, a length of 8 to 20 inches, and a width of 0.5 to 4 inches. The removable auxiliary bag section 12 can be used independently of the pack section 10 to store and transport infant care supplies. Handle 16 can be used to carry the removable auxiliary bag section 12.

The changing pad 26 can be removed from compartment 74 as needed and then unfolded, as shown in FIG. 10, to form a clean, soft surface upon which an infant's diaper may be changed.

As depicted in FIG. 9, the primary bag section 10 may be used without the removable auxiliary bag section 12. First 20 and second 22 adjustable straps may be used to carry the primary bag section upon the user's back in the same manner that a common backpack is carried. The primary bag section 10 is best used alone for medium length excursions of up to six hours in duration. The primary bag section 10 simplifies the feeding process by providing a booster chair 24 and a cooler compartment 56 in which the infant's formula and other food items may be stored.

The infant care bag of the first embodiment can be fabricated by covering an extruded plastic framework with a fabric such as nylon or vinyl. The use of a fabric covering makes the infant care bag aesthetically appealing and facilitates its easy and convenient cleaning.

As depicted in FIG. 6, the vinyl or fabric covering is used to form a hinge 80 for the door 28 to compartment 34. First 82 and second 84 hook and loop fastening members form a latch which secures the door 30 in a closed position. Each of the doors of the infant care bag may be attached and secured in this manner.

A shelf 33 is disposed within the upper compartment 34. The shelf 33 has a lip 61 which rests upon corresponding lips 63 and 65 formed upon the front 67 and rear 66 panels of the primary bag section 10. A curtain 140 is attached to and hangs from the shelf 33.

The curtain insulates the cooler compartment 56 and is more thoroughly described with respect to the second embodiment below. An air gap 146 is formed between the curtain 140 and the walls of the cooler compartment 56 and aids in insulating the contents of the cooler compartment 56 from the environment.

FIGS. 11-13 illustrate an alternative construction of the first embodiment or infant care bag The infant care bag of FIGS. 11-13 is constructed by the vacuum forming of plastic sheets. A restraining strap 96A has been added to secure the infant upon the booster seat 24A. The booster seat 24A is attached to the primary bag section 10A with strap hinges 28A. A buckle 98A removably attaches to the restraining strap 96A to the booster seat 24A. The buckle 98A is used to detach the restraining strap 96A when placing the infant upon the booster seat 24A and when removing the infant from the booster seat 24A. Hook and loop fasteners 120A, 122A and 124A removably attach the removable auxiliary bag section 12A to the primary bag section 10A. Each of the doors, 28A, 32A and 54A are removably attached to the infant care bag using zippers 126A, 128A and 130A respectively.

As shown in FIG. 12, the internal shelves 34A and 35A can be removed from the primary bag 10A for cleaning. The shelves 33A and 35A, along with insulating curtain 140A, best shown in FIG. 12A, can be cleaned together using a common household dishwashing machine. Tabs 154A rest upon a lip formed along the uppermost edge of compartment 56A and support both the upper shelf 33A and the curtain 140A. When the shelves 33A and 35A are installed within the cooler compartment 56A, the cooler compartment 56A is completely insulated from its ambient environment by the insulating curtain 140A. The insulating curtain 140A extends across the lower surface of tray 34A and also has a floor 142A. A portion of the insulating curtain (not shown) is similarly disposed along the inner surface of cooler door 54A. Therefore, the entire contents of the cooler compartment 56A are thermally insulated from the environment.

Although the multipurpose traveling bag of the first embodiment was specifically designed to contain infant care items, both the primary bag section 10 or 10A and the removable auxiliary bag section 12 or 12A can be used to carry and store non-infant care related supplies, such as camera or video equipment. The removable auxiliary bag section 12 or 12A is ideal for use as a handbag. The primary bag section 10 or 10A can be used for picnics and other day outings. Therefore, the infant care bag remains a useful product even after the infant matures and infant care items are no longer needed.

Referring now to FIGS. 14 through 20, the backpack of the second embodiment of the present invention is depicted. As in the infant care bag of the first embodiment, the backpack is divided into two separable sections. However, in the second embodiment the sections are not specifically sized to accommodate infant care items. Rather, the sections are sized to maximize their utility to a camper or hiker. A first or primary bag section 200 has adjustable straps 217 (FIG. 18) by which the backpack may be carried upon the user's back in the manner of a contemporary backpack. Handles 204 and 206 provide a convenient means of carrying both the primary bag section 200 and auxiliary bag section 202 when they are configured as a single unit as well as when they are carried separately. A flap 216 covers the straps 217 when the backpack is to be hand carried and not worn upon the user's back. The flap 216 prevents the straps 217 from dangling and thus providing an untidy appearance and unsafe condition.

The primary bag section 200 comprises a cooler compartment 218 and a small compartment 220 attached to the lower rear portion of the cooler compartment 218. The cooler compartment 218 may be accessed from the top of the primary bag section 200 by unzipping zipper 224 and opening lid 222 or by unzipping zipper 214 on the side of the primary bag section and opening side door 212. The small compartment 220 is not divided into two sections as was done in the first embodiment to accommodate diaper and pre-moistened tissues. Rather, the small compartment 220 remains unpartitioned to accommodate large items which should be readily accessible, such as sweaters or jackets. A removable shelf (not shown) may be used as in the first embodiment to separate the cooler compartment 218 into two sections as in the first embodiment, each of which may be accessed separately through the lid 222 and side door 212.

A magazine pocket 209 is formed in the flap 216 and can be closed with a zipper 208. The magazine pocket 209 provides a convenient and easy means for storing magazines and the like such that they can be stored and retrieved without having to open either the small compartment 220 or auxiliary bag section 202 and rifle through the contents thereof.

The auxiliary bag 202 is disposable upon the small compartment 220 in laminar juxtaposition to the cooler compartment 218. The auxiliary bag 202 has a handle 206 which is preferably formed in a like manner to handle 204 and positioned such that the two handles 204 and 206 may be used in cooperation to hand carry the backpack of the present invention. The auxiliary bag 202 may be opened by unzipping zipper 228 and raising lid 226 to provide access thereto. The auxiliary bag 202 provides a convenient means to carry a smaller quantity of personal items, camping goods, or the like and is particularly useful when used in conjunction with the primary bag section 200. For example, on a camping trip those supplies needed at the base camp could be stored and transported within the primary bag section 200 while those supplies needed away from the base camp could be stored and transported within the auxiliary bag section 202. The auxiliary bag section 202 could be used to carry swim wear, a towel, and a nonperishable snack. Thus, the user is not forced to carry the entire backpack on shorter trips where fewer items are required.

The auxiliary bag section 202 is attached to the primary bag section 200 with a suitable attachment means such as hook and loop fasteners 230. Rings 282 of the primary back section 200 and rings 284 on the auxiliary bag section 202 provide a means for attaching a shoulder strap (not shown). The rings and/or shoulder strap can also be used to further secure the primary bag section 200 and the auxiliary bag section 202 together.

An umbrella holder comprised of an upper umbrella clamp 236 and a lower umbrella clamp 238 is formed upon the side of the primary bag section 200 to provide a convenient means of readily accessing an umbrella in the event of rain. The holder can be used to carry a variety of elongate items such as fishing rods, tennis rackets, and collapsible tent posts.

A seat 280 is attached to the primary bag section 200 using a hinge 248. Hinge 248 is preferably formed of a flexible fabric material, such as that covering the backpack. Hook and loop fasteners 244 and 246 secure the seat in the operably disposed position. Like hook and loop fasteners (not shown) also secure the seat in a stowably disposed position.

An external pocket 232 is formed upon the outside surface of the auxiliary bag section 202 in a fashion similar to that of the magazine pocket 209 formed upon the flap 216 of the primary bag section 200. Pocket 232 may be used to carry small commonly required items such as the wearer's wallet, comb, and the like. Zipper 234 permits access to pocket 232.

A zippered key pocket 210 formed on the cooler compartment door 212 provides a convenient and readily accessible storage compartment for the wearer's keys. Thus, the user need not fumble through the backpack's contents in order to locate a house or car key. Ring 211 provides for easy operation of the key pocket 210 zipper.

Figure 19:
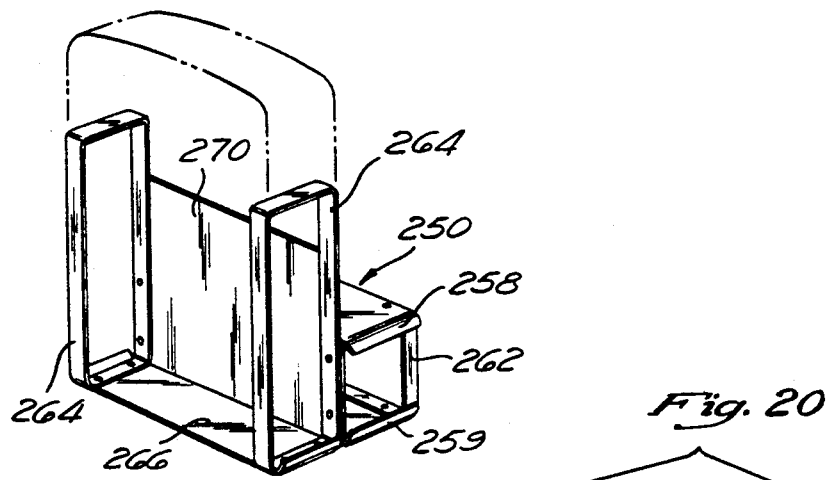
FIG. 19 is a perspective view of the structural frame of the primary bag section seat.
Figure 20:
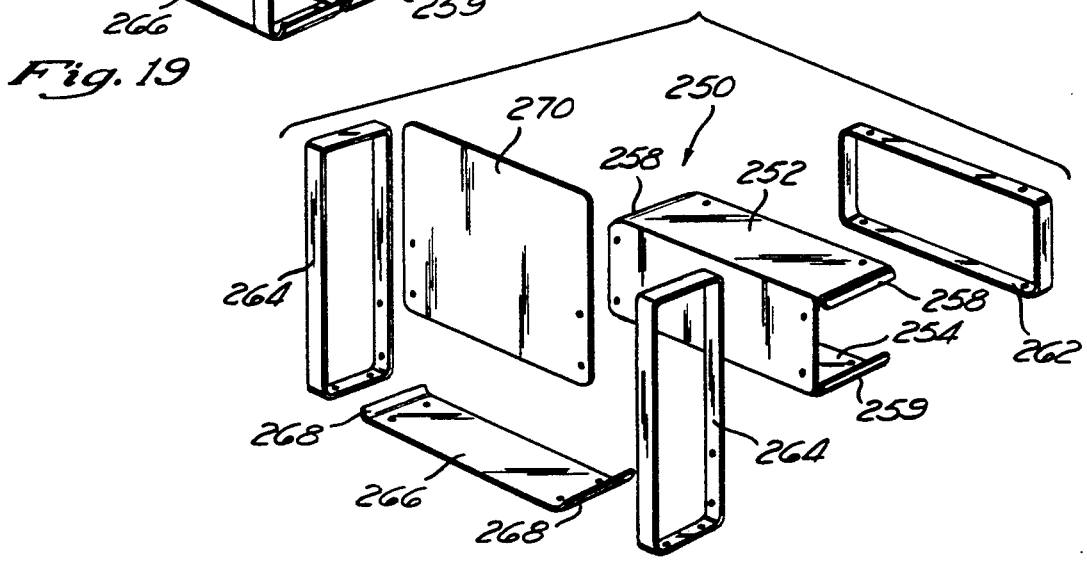
FIG. 20 is an exploded perspective view of the structural frame of the primary bag seat of FIG. 19.

The seat 280 and the primary bag section 200 are formed to accommodate the weight of an adult. A metal structure shown in FIG. 19 provides structural support to the backpack such that an adult's weight may be supported. The metal framework is comprised of a shell 250, an opening brace 262, two side braces 264, a floor 266, and a back plate 270.

As shown in FIG. 19, the shell 250, opening brace 262, vertical braces 264, backplate 270 and floor 266 cooperate to provide a structurally sound support which is light enough to be an integral component of the backpack and which has the required strength to support an adult.

Generally rectangular parallelepiped shaped shell 250 forms a box like structure which defines the walls and opening to the small compartment 220. The shell 250 in cooperation with the rectangular opening brace 262 supports the weight of an adult sitting upon seat 280. Rounded lips 258 and 259 formed upon the upper 252 and lower 254 surfaces respectively, of the shell 250 add a smooth and aesthetically pleasing look to the backpack. Back plate 270 is attached to rectangular side braces 264 and forms a back rest. Thus, a structurally sound and lightweight seat is formed which is an integral part of the backpack and does not contribute significantly to the weight thereof.

An insulating curtain 272 (shown in FIG. 18) is insertable within the cooler compartment 218 to provide thermal insulation to perishable food items stored therein. The insulating curtain 272 may be removed and cleaned. The insulating curtain 272 is formed substantially in the shape of the cooler compartment 218, but lacks a top and side, thus providing a side access 274 and a top access 276 to the cooler compartment 218. Thermal insulation may be applied to the side door 212 and lid 222 to compensate for the lack of insulation upon the insulating curtain 272 in these areas.

Referring now to FIGS. 21-23, the infant bicycle seat of the third embodiment of the present invention is illustrated. The infant bicycle seat is comprised of infant care bag 350, such as that of the first embodiment of the present invention, and a mount frame 300 which attaches the infant care bag to the bicycle.

The mount frame 300 of the infant bicycle seat is comprised of two vertical support members 306 which are connected together with an upper cross member 308 and a lower cross member 302. The upper cross member 308 is configured and positioned to provide sufficient room for a child to be seated upon the infant care bag 350. The upper cross member 308 is preferably positioned six to ten inches forward of the backrest portion of the infant care bag 350. A brace 304 is connected to the upper cross member 308. The lowermost ends of the support members 306 receive support bars 322 and the forwardmost end of the brace 304 receives brace bar 324. Support bars 322 and brace bar 324 are slidably disposed within support members 306 and brace 304 respectively. Thus, the support bars 322 and the brace bar 324 can telescope to a plurality of different lengths where they may be locked in place and thereby provide adjustment to accommodate different bicycle sizes and configurations.

Pads 316 provide a cushioned surface for the comfort of the infant. They also serve to prevent injury in the event that the infant abruptly contacts the upper cross member 308.

Clamps 326 attach support bars 322 to the bicycle frame near the rear axle. Upper attachment means 328 similarly attaches the brace bar 324 to the bicycle frame near the seat.

Attachment means such as screws and nuts 318 attach the mount frame 300 to the infant care bag 350. Attachment means such as screws and wing nuts 320 adjustably attach the support bars 322 and brace 324 to the mount frame 300.

The infant bicycle seat of the third embodiment of the present invention thus provides a safe and comfortable means of transporting an infant upon a bicycle while also transporting a variety of infant care supplies and perishable food items. This eliminates the need to attempt to carry separate bags and a cooler while transporting an infant by bicycle and thereby reduces the likelihood of injury to both the rider and infant.

It is understood that the exemplary multipurpose travel bags described herein and shown in the drawings represent only presently preferred embodiments of the invention. Indeed, various modifications and additions may be made to such embodiments without departing from the spirit and scope of the invention. For example, the size, shape, and configuration of the bag can be varied considerably. The precise location of the compartments and the nature of the items stored therein is not considered crucial to this invention. Also, various other materials may be found to be suitable for the fabrication of the bag. Thus, these and other modifications and additions may be obvious to those skilled in the art and may be implemented to adapt the present invention for use in a variety of applications.

What is claimed is:

1. An infant bicycle seat comprising:
   (a) a bag section, said bag section having at least one closable compartment formed therein, said bag section configured to define a seat such that an infant may sit thereon; and
   (b) a mounting frame attachable to said bag section for attaching said bag section to a bicycle, said mounting frame comprising:
      (i) two support members attachable to said bag section and attachable to a bicycle;
      (ii) at least one cross member connecting said support members; and
      (iii) a brace attached perpendicularly to one of said cross members and attachable to a bicycle;
   (c) a seat, rotatably attached to said bag section;
   (d) wherein said seat has a stowably disposed position in which said seat is laminarly juxtaposed to a vertical external surface of said bag section; and
   (e) wherein said seat has an operably disposed position in which said seat extends perpendicularly from the vertical exterior surface of said bag section and provides a surface upon which an infant may sit.

2. The infant bicycle seat as recited in claim 1 wherein said support members and said brace are adjustable in length.

3. The infant bicycle seat as recited in claim 2 further comprising a cushion formed upon at least one of said cross members.

4. The infant bicycle seat as recited in claim 1 wherein at least one of said closable compartments is a cooler compartment, said cooler compartment having an inner surface.

5. The infant bicycle seat as recited in claim 4 further comprising:
   (a) a shelf disposed within said cooler compartment; and
   (b) an insulating curtain disposed substantially about the inner surface of said cooler compartment.

6. An infant bicycle seat comprising:
   (a) a bag section, said bag section having at least one closable compartment formed therein, said bag section configured such that an infant may sit thereon;
   (b) two support members attachable to said bag section and attachable to a bicycle, each of said support members extending downwardly from said bag section and having an opening formed in their lowermost ends;
   (c) at least one cross member connecting said support members;
   (d) a brace extending forward from at least one of said cross members, said brace having an opening formed in its forwardmost end;
   (e) one support bar receivable into the opening formed in the lowermost end of each of said support members
   (f) a brace bar receivable into the opening formed in said brace member;
   (g) means for attaching said support bars and said brace bar to a bicycle;
   (h) a seat, rotatably attached to said bag section;
   (i) wherein said seat has a stowably disposed position in which said seat is laminarly juxtaposed to a vertical external surface of said bag section;
   (j) wherein said seat has an operably disposed position in which said seat extends perpendicularly from the vertical exterior surface of said bag section and provides a surface upon which an infant may sit; and
   (k) wherein said support bars are slidably adjustable within said support members and said brace bar is slidably adjustable within said brace member.

7. The infant bicycle seat as recited in claim 6 wherein at least one of said means for attaching said support bars and said brace bar to a bicycle comprise clamps.

8. The infant bicycle seat as recited in claim 6 wherein at least one of the closable compartments formed in said bag section comprises a cooler compartment.

9. The infant bicycle seat as recited in claim 6 further comprising:
   (a) a seat, rotatably attached to said bag section;
   (b) wherein said seat has a stowably disposed position in which said seat is laminarly juxtaposed to a vertical external surface of said bag section; and
   (c) wherein said seat has an operably disposed position in which said seat extends perpendicularly from the vertical exterior surface of said bag section and provides a surface upon which an infant may sit.

10. An infant bicycle seat comprising:
    (a) a bag having an exterior surface defining a seat portion and a backrest portion which define a seat upon which an infant may sit, said bag having a seat member rotatably secured to said bag adjacent said seat portion and said backrest portion such that said seat member can pivot between said seat portion and said backrest portion;
(b) at least one closable compartment formed within said bag such that said closable compartment may be closed when an infant is disposed upon said seat; and
(c) a mounting frame attachable to said bag for attaching said bag to a bicycle.

11. The infant bicycle seat as recited in claim 10 wherein said seat member has a stowably disposed position in which said seat member is laminarly juxtaposed to the backrest portion of said bag and wherein said seat member has an operably disposed position in which said seat member extends perpendicularly from said backrest portion over said seat portion and provides a surface upon which an infant may sit.

* * * * *